United States Patent [19]

Iijima et al.

[11] 4,376,408
[45] Mar. 15, 1983

[54] AIR CIRCULATION SYSTEM IN A VEHICLE COMPARTMENT OF AN AUTOMOTIVE VEHICLE

[75] Inventors: Tetsuya Iijima, Tokyo; Hiroshi Yano, Higashiyamato, both of Japan

[73] Assignee: Nissan Motor Company, Limited, Kanagawa, Japan

[21] Appl. No.: 208,682

[22] Filed: Nov. 20, 1980

[30] Foreign Application Priority Data

Nov. 21, 1979 [JP] Japan .................. 54-160351[U]

[51] Int. Cl.³ .................................. B60H 3/06
[52] U.S. Cl. ......................... 98/2.03; 98/2.11; 98/2.18; 98/33 A
[58] Field of Search ............ 98/2, 2.03, 2.04, 2.11, 98/2.18, 33 A

[56] References Cited

U.S. PATENT DOCUMENTS

| | | |
|---|---|---|
| 2,055,843 | 9/1936 | Helfinstine .................. 98/2.03 X |
| 2,187,982 | 1/1940 | Moncrief . |
| 2,241,755 | 5/1941 | Zaccone .................... 98/2.03 |
| 2,344,864 | 3/1944 | Griswold .................. 98/2.03 X |
| 2,533,509 | 12/1950 | Rodert . |
| 2,663,243 | 12/1953 | Wunderlich . |
| 2,761,291 | 9/1956 | Golding . |
| 2,922,290 | 1/1960 | Carraway . |
| 3,444,700 | 5/1969 | Beyer . |
| 3,595,029 | 7/1971 | Lende . |
| 3,651,659 | 3/1972 | Nakao et al. |
| 3,908,900 | 9/1975 | Smith |
| 3,919,926 | 11/1975 | Yamada .................. 98/2.03 |
| 4,079,665 | 3/1978 | Martin .................. 98/33 A |
| 4,259,896 | 4/1981 | Hayashi et al. |

FOREIGN PATENT DOCUMENTS

| | | |
|---|---|---|
| 2416805 | 10/1975 | Fed. Rep. of Germany . |
| 829324 | 6/1938 | France ...................... 98/2 |
| 1132125 | 3/1957 | France . |
| 642352 | 8/1950 | United Kingdom. |
| 964615 | 7/1964 | United Kingdom. |
| 1246803 | 9/1971 | United Kingdom. |
| 2042162 | 9/1980 | United Kingdom. |

*Primary Examiner*—Albert J. Makay
*Assistant Examiner*—Harold Joyce
*Attorney, Agent, or Firm*—Lowe, King, Price & Becker

[57] ABSTRACT

An air circulation system for effectively and comfortably circulating the air in the vehicle compartment, which system comprises an air passage having intake below the rear seat and outlet in the rear pacel shelf. Thereby, the air in the vehicle compartment is drawn to the intake of the air passage and discharged from the rear portion of the rear seat. This is cooperatively effect to air flow in the vehicle compartment for circulating the air therein effectively and comfortably.

6 Claims, 6 Drawing Figures

FIG. I

AIR CIRCULATION SYSTEM IN A VEHICLE COMPARTMENT OF AN AUTOMOTIVE VEHICLE

BACKGROUND OF THE INVENTION

The present invention relates generally to an air circulation system for circulating air within a vehicle compartment of an automotive vehicle. More particularly, the invention relates to improvements in automotive air circulation systems to effectively and comfortably circulate air within the vehicle compartment, which system includes a means for discharging the air from the rear parcel shelf.

Air conditioners are usually employed in automotive vehicles to circulate air within the vehicle compartment and regulate temperature. However, conventional air conditioning systems including an air circulating system tends to create uneven air temperature distribution in the various portions of the vehicle compartment. To overcome this problem, various improvements have been proposed and attempted; however, such proposed systems do not appear capable of effectively overcoming the problem extant in the conventional systems; i.e. unevenness of air flow within the vehicle compartment.

SUMMARY OF THE INVENTION

It is an object of the present invention to provide an air circulation system cooperative with the air conditioner of an automotive vehicle to effectively circulate the air in the vehicle compartment.

Another object of the present invention is to provide an air circulating system for an automotive vehicle including a means for discharging air from the rear parcel shelf of the vehicle body so that the air can comfortably circulate within the vehicle compartment.

According to the present invention, there is provided an air circulation system for effectively and comfortably circulating the air in the vehicle compartment. The system comprises an air passage having an intake below the rear seat and an outlet in the rear parcel shelf. The air in the vehicle compartment is drawn through the intake opening of the air passage for discharge from the rear portion of the rear seat to effect air flow in the vehicle compartment and effectively circulate air therein.

According to the preferred embodiment of the present invention, the passage is connected to the drain passage for ventilating the air in the vehicle compartment. To selectively control air flow through either the outlet in the rear parcel shelf or the ventilation passage, a switching means is provided for selectively connecting the intake to the outlet or the ventilation passage.

If desired, air purifier means can be provided adjacent the outlet of the air passage for purifying the air to be discharged to the vehicle compartment.

The other objects and advantages will become apparent from herebelow given descriptions with respect to the preferred embodiments.

BRIEF DESCRIPTION OF THE DRAWINGS

The present invention will be more fully understood from the detailed description given hereinbelow and from the accompanying drawings of the preferred embodiments of the present invention, which, however, should not be taken as limitative to the invention and for elucidation and explanation only.

In the drawings.

DESCRIPTION OF THE PREFERRED EMBODIMENT

Figure 1:
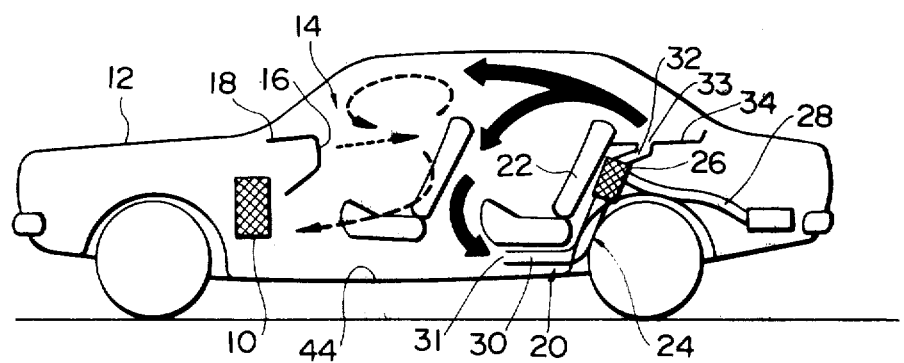
FIG. 1 is a fragmentary side elevational view of a preferred embodiment of an air circulation system according to the present invention.
Figure 2:
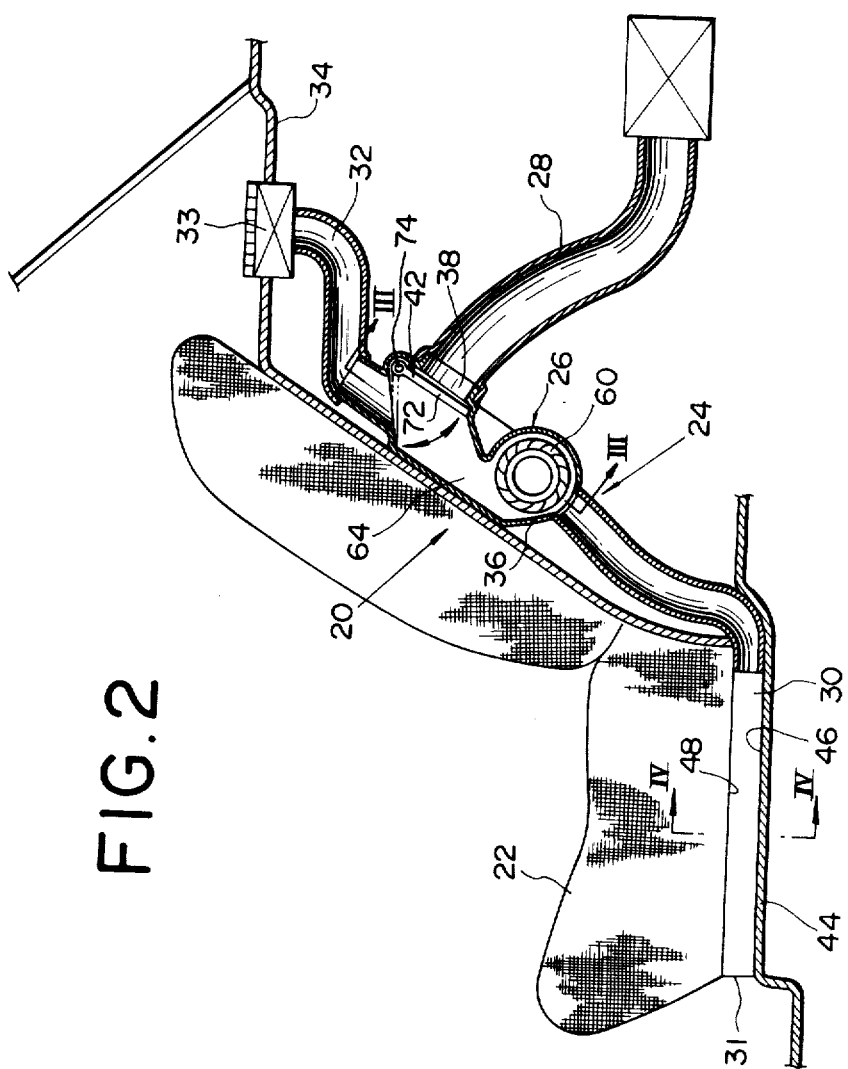
FIG. 2 is an enlarged side elevational view of the air circulation system of FIG. 1.

Referring now to the drawings, particularly to FIGS. 1 and 2, there is briefly illustrated a preferred embodiment of an air circulation system according to the present invention. An air conditioner 10 is generally positioned at the front portion in a vehicle body 12. The air conditioner 10 communicates with the vehicle compartment 14 defined in the vehicle body through an opening 16 formed in an instrument panel 18. From the opening 16, the conditioning air such as cooling air and warming air from the air conditioner 10 is discharged into the vehicle compartment. The conditioning air flows within the vehicle compartment 14 as shown in dotted line in FIG. 1.

As shown in FIG. 1, according to the present invention, an air circulation system 20 for effectively circulating the air in the vehicle compartment is provided at the rear portion of the rear seat 22. The air circulation system generally comprises an air passage 24 and a circulator fan 26. The air passage 24 is connected with a ventilation passage 28 for venting the air from the vehicle compartment through the ventilation passage.

As more clearly shown in FIG. 2, the air passage 24 comprises an upstream portion 30 and downstream portion 32 respectively positioned upstream and downstream of the circulator fan 26. The outer end 31 of the upstream portion 30 opens below the rear seat 22 adjacent a vehicle floor panel 44. On the other hand, the downstream portion 32 of the air passage 24 opens at the outer end 33 thereof in rear parcel shelf 34. The circulator fan 26 includes a connecting duct 36 which is provided with an auxiliary opening 38. To the auxiliary opening 38 is connected the ventilation passage 28 for ventilating the air from the vehicle compartment into the atmosphere. A damper 42 is provided within the connecting duct 36 for selectively communicating the downstream portion 32 of the air passage 24 and the ventilation passage 28.

Figure 4:
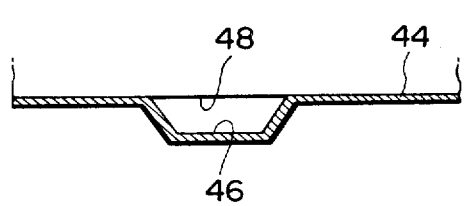
FIG. 4 is a further enlarged sectional view of a part of the air circulation system taken along line IV—IV of FIG. 2.
Figure 5:
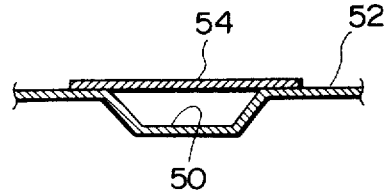
FIG. 5 is a similar view to FIG. 4 but showing the modification of the construction of the corresponding part to the FIG. 4.

The upstream portion 30 of the air passage 24 extends along the vehicle floor panel 44. In practice, the portion below the vehicle rear seat of the air passage 24 can be formed in various configurations, however, in the preferred embodiment, the portion is formed as shown in FIGS. 4 or 5. In FIG. 4, an elongated depression or groove 46 is formed in the vehicle floor panel 44 between the floor panel and lower surface 48 of the rear seat to define part of the air passage 24 extending below the rear seat. Alternatively, shown in FIG. 5, a corresponding depression 50 formed in the vehicle floor panel 52 is covered with a cover plate 54 to defined therebetween the corresponding part of passage 24.

Figure 3:
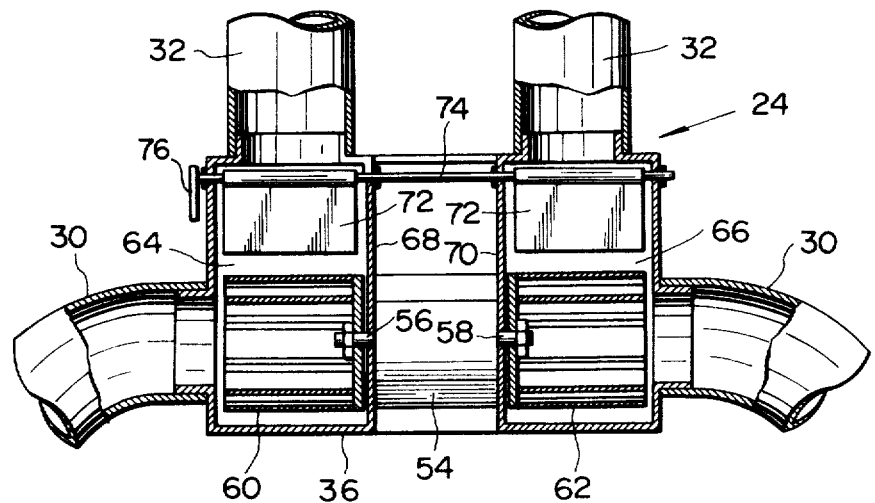
FIG. 3 is a cross-sectional view of the air circulation system of FIG. 2, taking along line III—III of FIG. 2.

As shown in FIG. 3, the circulator fan 26 comprises an electric motor 54 having two output shafts 56 and 58 extending both sides thereof. Fan members 60 and 62 are fixedly secured on the output shafts 56 and 58. The fan members 60 and 62 are respectively disposed within chambers 64 and 66 defined within the connecting duct 36 by partitions 68 and 70. To each of the chambers 64 and 66, the upstream portion 30 of the air passage 24 is connected. Likewise, of the air passage 32 is connected to each chamber 64 and 66 and the ventilation passage 28 is also connected to each chamber 64 and 66. The damper 42 is rotatably disposed within each chamber to selectively cover the upstream ends of the passage 32 or the ventilation passage 28. A damper blade 72 is secured to a rotary shaft 74 which is rotatably supported on the outer periphery of the connecting duct 36 and the partitions 68 and 70.

In response to operation of fan 26, the air in vehicle compartment 14 is drawn into the air passage 24 from the outer end 31 below the rear seat 22. When the damper 42 closes the inner opening of the ventilation passage 28, the air flowing through air passage 24 is discharged through outer end 33 of the downstream air passage 32 of the air passage 24 at the parcel shelf 34. In this manner the air within vehicle compartment 14 is forced to circulate in the compartment (as shown with thick line arrows in FIG. 1). Thereby, the conditioning air supplied from the air conditioner 10 through the opening 12 of the instrument panel 18 effectively circulates within the vehicle compartment to obtain an even temperature distribution in the compartment for driver and passenger feel comfort. If ventilation of the air from the vehicle compartment is required, the damper 42 is rotated to change the position thereof to close the inner end of the downstream portion 32 of the air passage 24 and to open the inner end of the ventilation passage 28 to ventilate the air in the vehicle compartment to the atmosphere.

In practice, the operation means of the damper blade 72 can be embodied in any suitable manner. For example, as shown in FIG. 3, a manually operated lever 76 can be secured to shaft 74 to operate the dampers. Alternatively, lever 76 can be replaced with means for automatically or semi-automatically operating the damper blade.

Figure 6:
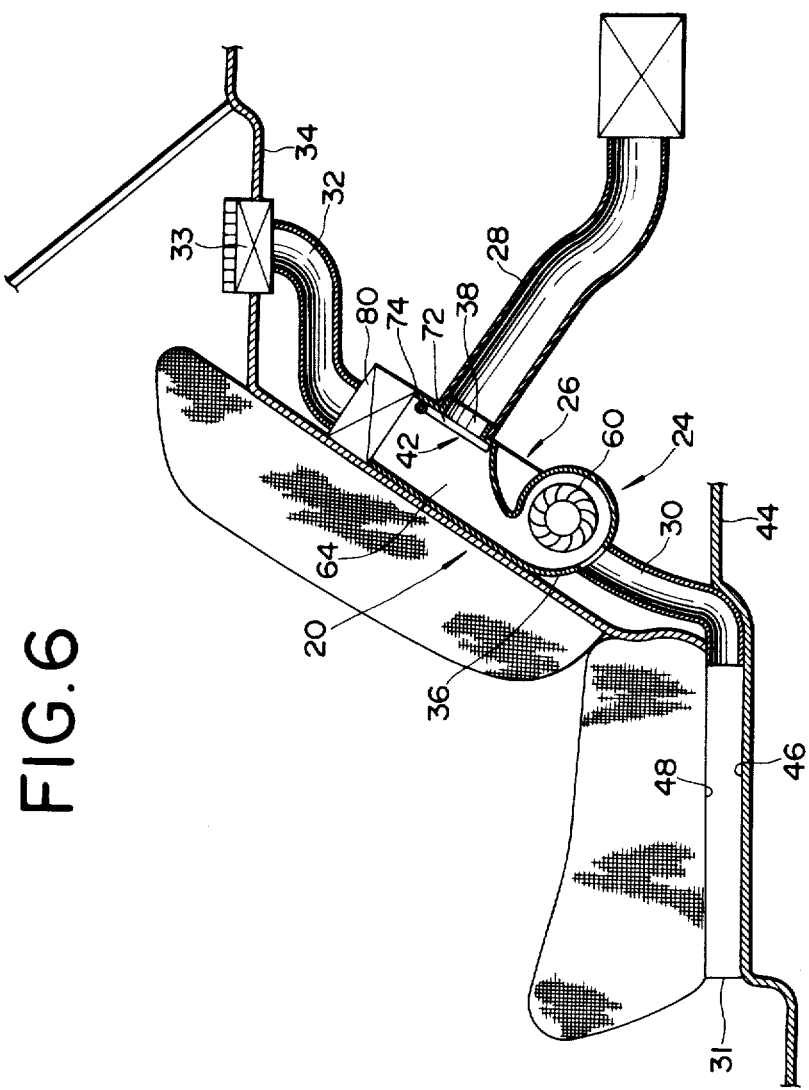
FIG. 6 is a side elevational view of another embodiment of the air circulation system according to the present invention.

Referring to FIG. 6, there is illustrated another embodiment of the circulation system according to the present invention. It will be advisable that the construction of the air circulation system according to the present embodiment is similar to that of FIG. 2 and therefore the elements consisting the present embodiment and corresponding to the elements in the preceding embodiment will be represented by the same reference numerals for simplification of explanation and for avoiding confusion in the difference numerals therebetween.

In FIG. 6, an air purifier 80 is provided at the inner end of the downstream portion 32 of the air passage 28. The purifier 80 can be embodied in any suitable way; for example, it can include a filter of activated carbon for cleaning the air flowing therethrough with static electricity. Also, it is possible to embody the air purifier in use with minus-ion generator. By the present embodiment, the air flowing through the air passage 24 can be purified and then discharged through the outer end 33 opening of the downstream portion 32. Therefore, the air in the vehicle compartment is purified as well as circulated comfortably.

It should be noted that the damper device and the ventilation passage are not always necessary and it is possible to embody the air circulation system according to the present invention without them. In this case, the air is only circulated in the vehicle compartment and is not ventilated therefrom.

What is claimed is:

1. An air circulation system for circulating air in an automotive vehicle compartment comprising:
    an air intake opening located below a rear vehicle seat;
    an air outlet located at a rear portion of said rear vehicle seat for discharging air upwardly into said vehicle compartment;
    air passage means interpositioned between said air intake opening and said outlet, said passage means including air circulating means for generating flow of air within said air passage means and forcing the air to flow through said air passage means;
    a ventilation passage communicating with said air passage means downstream of said air recirculating means, said ventilation passage communicating with the atmosphere to discharge air from the vehicle compartment;
and
    damper means provided upstream of said outlet and operatively positioned in the air passage means and being selectively movable (1) to establish a first air flow path from the intake opening to the air outlet to recirculate air within the compartment and (2) to establish a second air flow path from the intake opening to the ventilation passage to ventilate air to the outside of the compartment, said damper means thereby switching, recirculating and ventilating air in the vehicle compartment.

2. An air circulation system for circulating air in a vehicle compartment comprising:
    an air intake defined below a vehicle seat;
    an air outlet located at a rear portion of a vehicle rear seat and directed upwardly to discharge the air introduced through said air intake for recirculation within the vehicle compartment;
    air passage means interpositioned between said air intake and said outlet and including an air circulating means for generating a flow of air within said air passage means and forcing the air to flow therethrough;
    a ventilation passage joined with said air passage means downstream of said air circulating means which passage is adapted to ventilate the air to the outside of the vehicle compartment; and
    damper means provided upstream of said outlet and being movable between a first position where said air passage means is connected to said outlet and a second position where said air passage means is connected to said ventilation passage said damper means thereby switching, recirculating and ventilating air in the vehicle compartment.

3. A system as set forth in claims 1 or 2, wherein said air intake is defined by a downwardly depressed groove formed on a vehicle body floor panel extending below said vehicle seat.

4. A system as set forth in claim 1, wherein said groove is closed with a closure member extending across the opened upper end thereof.

5. A system as set forth in claims 1 or 2, wherein said outlet has an air purifier for purifying the air to be recirculated into said vehicle compartment.

6. A system according to claim 1 or 2, wherein said ventilation passage includes one end operatively connected to the air passage means downstream from the air circulating means and an opposite end opening to an area outside the vehicle compartment.

* * * * *